UNITED STATES PATENT OFFICE.

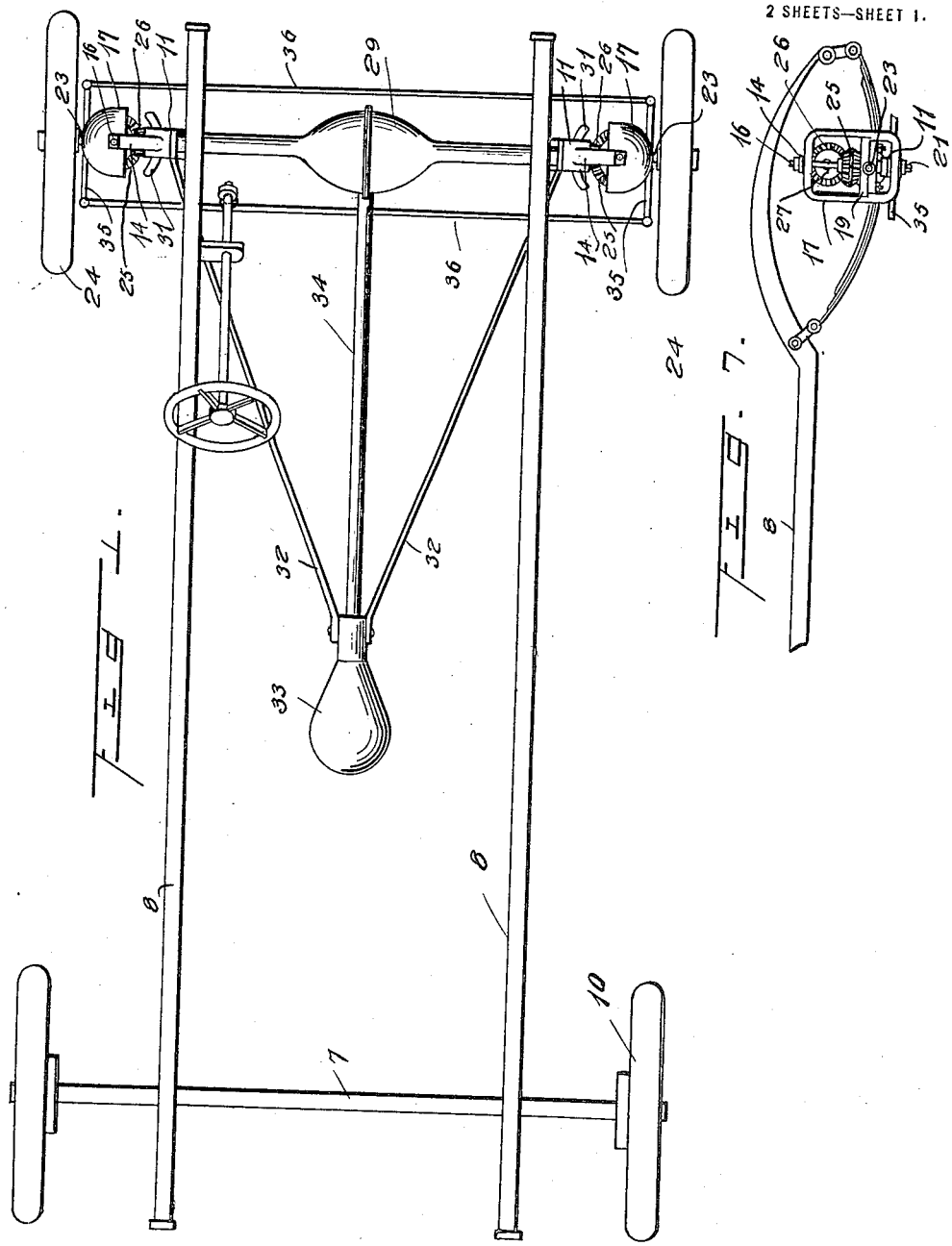

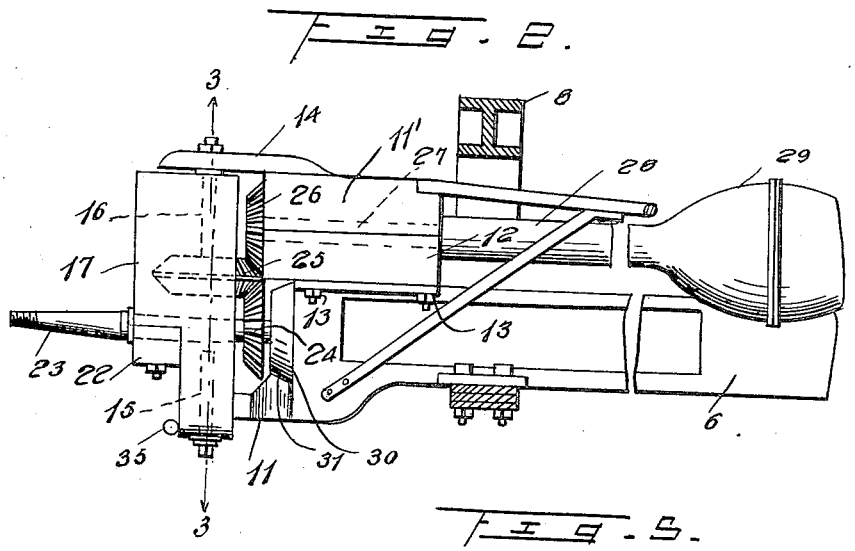

WALLACE B. LOUTHAN, OF MARSHALLTOWN, IOWA.

MOTOR-VEHICLE.

1,331,205.  Specification of Letters Patent.  Patented Feb. 17, 1920.

Application filed March 1, 1918. Serial No. 219,886.

*To all whom it may concern:*

Be it known that I, WALLACE B. LOUTHAN, a citizen of the United States, residing at Marshalltown, in the county of Marshall and State of Iowa, have invented certain new and useful Improvements in Motor-Vehicles; and I do hereby declare the following to be a full, clear, and exact description of the invention, such as will enable others skilled in the art to which is appertains to make and use the same.

This invention relates to improvements in motor vehicles of the character set forth in my application for Letters Patent, filed September 14, 1917, and serially numbered 191,432, and has for one of its objects the provision of means whereby the spindle of the front axle can be driven or rotated as well as shifted laterally in either direction to steer the vehicle.

Another object of this invention is the provision of beveled arcuate shaped tracks adapted to support beveled rollers on the spindles whereby the ends of the spindles are supported regardless of their position.

A still further object of this invention is the provision of a front drive for a motor vehicle of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to following description and accompanying drawings, in which:

Figure 1 is a plan view of a motor vehicle constructed in accordance with my invention.

Fig. 2 is an enlarged front elevation of one end of the front axle.

Fig. 3 is a vertical sectional view through the steering knuckle taken on line 3—3 of Fig. 2.

Fig. 4 is a detail sectional view, illustrating the means for supporting the inner ends of the spindles.

Fig. 5 is a transverse sectional view, illustrating the bearing plates upon the axle.

Fig. 6 is a detail sectional view illustrating the beveled arcuate shaped track.

Fig. 7 is a fragmentary vertical sectional view illustrating the driving connection between the spindles and the drive axle.

Referring to the drawings, in detail wherein similar reference numerals designate corresponding parts throughout the several views, the numerals 6 and 7 indicate the front and rear axles of a vehicle supporting the chassis 8. The chassis 8 is of the ordinary construction, having its ends slightly dished or curved for the purpose of permitting the axles to have free movement. Springs are preferably interposed between the chassis and the front and rear axles and are preferably secured to the under faces of the axles as clearly shown in the drawings, and the rear axle is equipped with the usual rear wheels 10.

Each end of the axle 6 is provided with an integral lower arm 11 having an apertured terminal. Bearing blocks 11' and 12 are placed one above the other and are secured to the top face of the axle adjacent each end by means of bolts 13, and the bearing block 11' has integrally formed therewith an arm 14 which extends parallel with the arm 11 and is provided with an aperture. The arms 11 and 14 receive lower and upper spindle bolts 15 and 16, respectively. A steering knuckle 17 is engaged at its top and bottom beneath the upper and lower arms 14 and 11 and the threaded portions 18 of the spindle bolts are received within corresponding threaded openings formed in the knuckle, whereby the latter is pivotally secured on a vertical axis to the end of the front axle 6. The medial portion of the steering knuckle 17 is formed with an integral web 19 having a recess 20 receiving the lower terminal of the spindle bolt 16.

The lower spindle bolt 15 extends upwardly through the lower part of the knuckle 17 and the axle arm 11 and is pivotally received within a recess 21 formed in a bearing plate 22 which is bolted or otherwise detachably secured underneath the web 19.

The spindle 23 for each front wheel 24 of the vehicle is rotatably confined between the horizontal web 19 and the bearing plate 22, and the inner terminals thereof which terminate between the arms 11 and 14 are each provided with a rotatable bevel-gear wheel 24 which meshes with the lower series of teeth formed on the double bevel-gear wheel 25. The wheel 25 is rotatably supported on the upper spindle bolt 16 and the upper series of teeth thereof mesh with the bevel-gear 26 supported by a differential and horizontally disposed axle shaft 27. A bushing 20' is interposed between the bevel gear wheel 25 and the spindle bolt 16. The differential shaft 27 is rotatably mounted within the bearing plates 11' and 12 and extends through a suitable housing 28 of the differential which overlies the axle 6, the axle 6 being dished to receive the enlarged portion 29 of the differential housing, and it may be secured thereto in any well known manner.

The double gear wheel 25 is rotatable upon the spindle bolt 16 and as its axis is concentric with the vertical axis of the steering knuckle 17, the latter may be readily turned in steering the vehicle without affecting the driving connection between the shaft 27 and the spindle 23.

The extreme inner terminals of each spindle 23 rotatably support a beveled roller 30 movable upon a beveled arcuate track 31 formed integral with the arm 11 of the front axle. The track 31 is curved concentrically with the pivotal axis of the steering knuckle 17, so as to permit the roller 30 to travel thereon during swinging movement of the knuckle. Brace rods 32 have one of their ends bifurcated or forked to form spaced arms, one of which is secured to the bearing plate 11' while the other is secured to the front axle 6. The other ends of the braces 32 are secured to torsion yokes 33 of the drive shaft housing 34, in which is mounted the drive shaft that connects with the differential in the differential housing 29. The drive shaft is connected in a well known manner to the prime mover (not shown) of the automobile and which is preferably mounted upon the chassis 8 adjacent the rear wheels or rear axle 7. It will, therefore, be seen that the power shaft will drive the shaft 27 which in turn drives the spindle 23 to and through the gears 26, 25 and 24, respectively.

Forwardly and rearwardly extending arms 35 are formed upon the steering knuckles 17 and are connected by transverse connecting rods 36 to cause the steering knuckle upon each end of the axle 6 to move in unison. Either one of the connecting rods 36 may have connected thereto in any well known manner the steering mechanism shown in Fig. 1.

While I have shown and described the preferred embodiment of my invention, it will be understood that minor changes in construction, combination and arrangement of parts may be made without departing from the spirit and scope of the invention as claimed.

Having thus described my invention, what I claim is:

A motor vehicle including a front axle having an arm, bearing members secured to the axle, a shaft journaled in said bearing members, a second arm secured to one of the bearing members, a steering knuckle disposed between said arms, a web formed in the knuckle, a plate secured to the web, upper and lower spindle bolts secured to the knuckle and passing through said arms, said bolts having their inner ends disposed in the web and plate, a double gear secured to the upper spindle bolt, an axle spindle journaled between the web and the plate and in the knuckle, means connecting the axle spindle with the double gear, and means connecting the double gear to the shaft.

In testimony whereof I affix my signature in presence of two witnesses.

WALLACE B. LOUTHAN.

Witnesses:
 WALTER KROMPE,
 A. C. URBAN.